Figure 1:
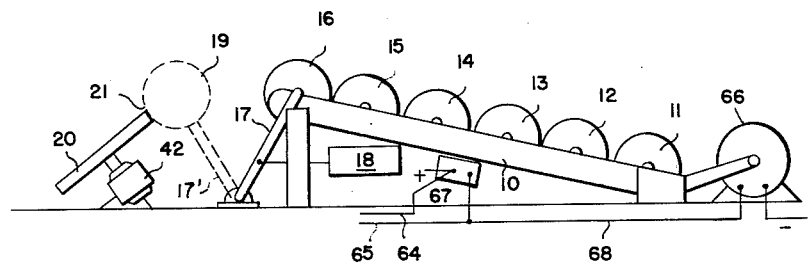

Sept. 14, 1965    B. I. ANDERBERG ETAL    3,206,131
APPARATUS FOR USE IN PRODUCING WOUND SHELLS OR SLEEVES
Filed Jan. 22, 1962    5 Sheets-Sheet 1

INVENTORS
BO INGEMAR ANDERBERG
SVEN HARALD CLAESSON

BY Larson and Taylor

ATTORNEYS

Sept. 14, 1965   B. I. ANDERBERG ETAL   3,206,131
APPARATUS FOR USE IN PRODUCING WOUND SHELLS OR SLEEVES
Filed Jan. 22, 1962   5 Sheets-Sheet 3

INVENTORS
BO INGEMAR ANDERBERG
SVEN HARALD CLAESSON

BY Larson and Taylor

ATTORNEYS

Sept. 14, 1965  B. I. ANDERBERG ETAL  3,206,131
APPARATUS FOR USE IN PRODUCING WOUND SHELLS OR SLEEVES
Filed Jan. 22, 1962  5 Sheets-Sheet 4

INVENTORS
BO INGEMAR ANDERBERG
SVEN HARALD CLAESSON

BY Larson and Taylor

ATTORNEYS

United States Patent Office 3,206,131
Patented Sept. 14, 1965

3,206,131
APPARATUS FOR USE IN PRODUCING WOUND SHELLS OR SLEEVES
Bo I. Anderberg and Sven H. Claesson, Skovde, Sweden, assignors to Rockwool Aktiebolaget, Skovde, Sweden, a corporation of Sweden
Filed Jan. 22, 1962, Ser. No. 167,880
Claims priority, application Sweden, Jan. 30, 1961, 917/61
6 Claims. (Cl. 242—55.1)

It has been customary earlier to insulate pipe conduits which should carry hot fluids, gases or the like, by means of a thermal insulation material, for instance cotton or the like which has been packed around the piping and thereafter has been provided with a bandage. This method, in practice, has proved to be expensive as to both labor and material, but the insulation property has in spite of this been often less than was intended, because everything is dependent upon the accuracy of applying the insulation, and as it is very difficult afterwards to check how the work has been done. The need of supervision in such insulation projects has therefore been great.

Toward making possible a less expensive mounting and a better insulation, it has been proposed to produce so-called pipe shells, which are ready-made pieces of insulation in adapted lengths, fully enclosing or corresponding to given sectors of the circumference of the pipe, for instance 180° or 120°, whereby the pipe shells can be ready produced for immediate mounting, and further can be made of a cheaper material and can be checked easily both by the manufacturer and the consumer, for instance, regarding their specific weight and their dimensions. Mineral wool has been used for the production of such pipe shells.

In the production of pipe shells, one preferably proceeds in such a way as to produce a thin mat of the mineral wool, which is wound around a mandrel until it has obtained a suitable thickness. Before the production of the mat, the mineral wool has been impregnated with a binder such as a curable plastic, which is usually dissolved in a suitable solution, so that the pipe shell may be cured in a heated curing chamber, where the solution is evaporated and the curing plastic or binder is cured and brought to stiff condition, so that the desired form is obtained. The pipe shell can thereafter be subjected to other operations such as grinding, cutting, slitting, division into sectors, and so on, after the mandrel has been removed from same.

The present invention relates to apparatus for the production of such sleeves, preferably of pipe shells, of a suitable material, for instance from mineral wool, said material as a matter of simplicity being called mineral wool below, independently of its character. The production takes place by winding a thin mat of mineral wool onto a mandrel, an endless belt being provided to move about an essential part of the circumference of the mandrel, on which the sleeve or the pipe shell, respectively, is wound, so that the thin mineral wool mat, which has been prepared in advance, is fed between said endless belt and said mandrel and wound up on the latter one.

According to the invention at least one and preferably a plurality of pressure rollers are provided to execute pressure on the belt in the direction of the mandrel, and this is geared resiliently so that it can move away under influence of the pressure rollers, as the sleeve grows in diameter or thickness.

The apparatus of the invention thus is intended to function fully automatically so that the pipe shells are wound by machine without the operator of the machine needing to enter for influencing the winding procedure.

Of course it will be understood that while certain members of the apparatus are described and illustrated as being movably mounted relative to other members, the important feature is the relative movement and not the actual movement of either member.

Figure 2:
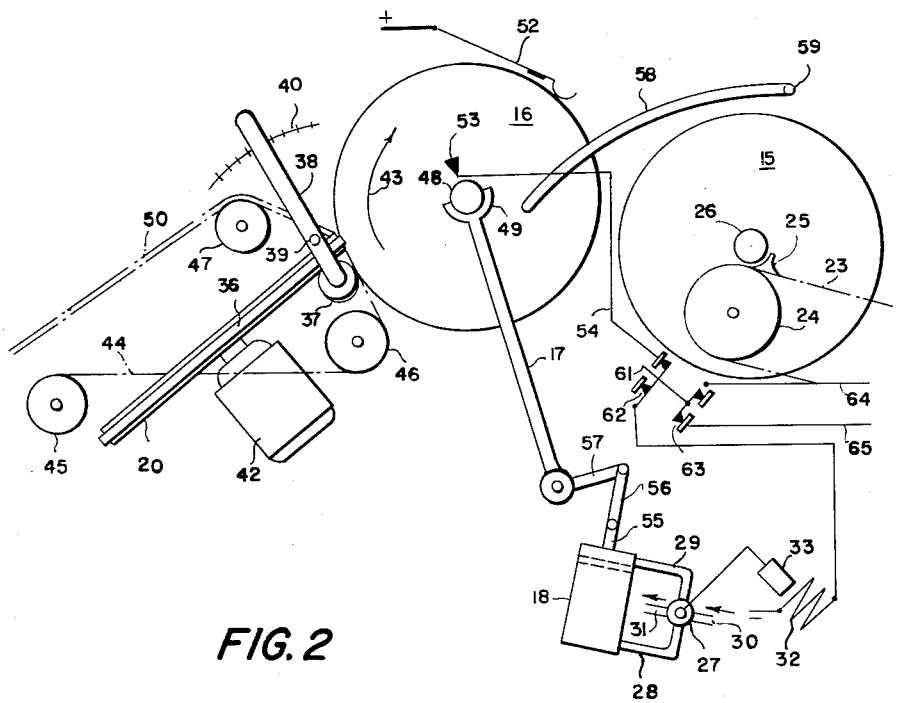
Figure 3:
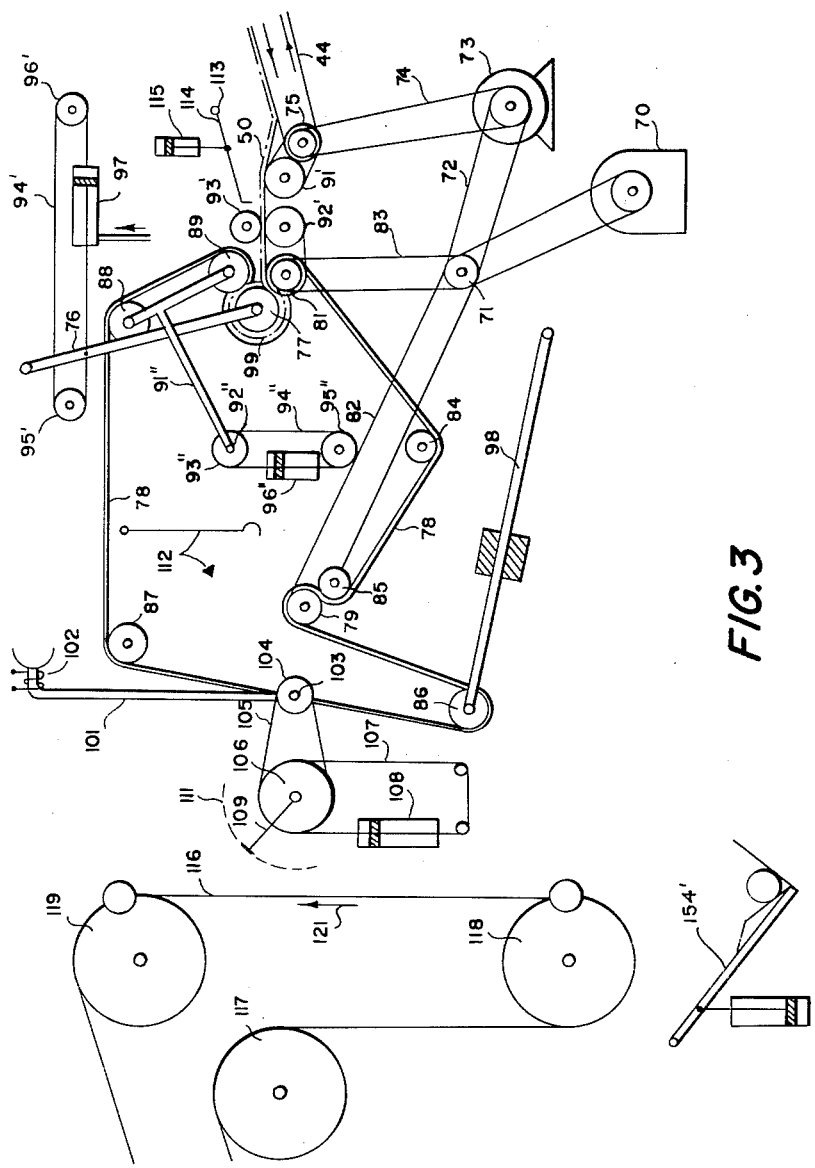
Figure 4:
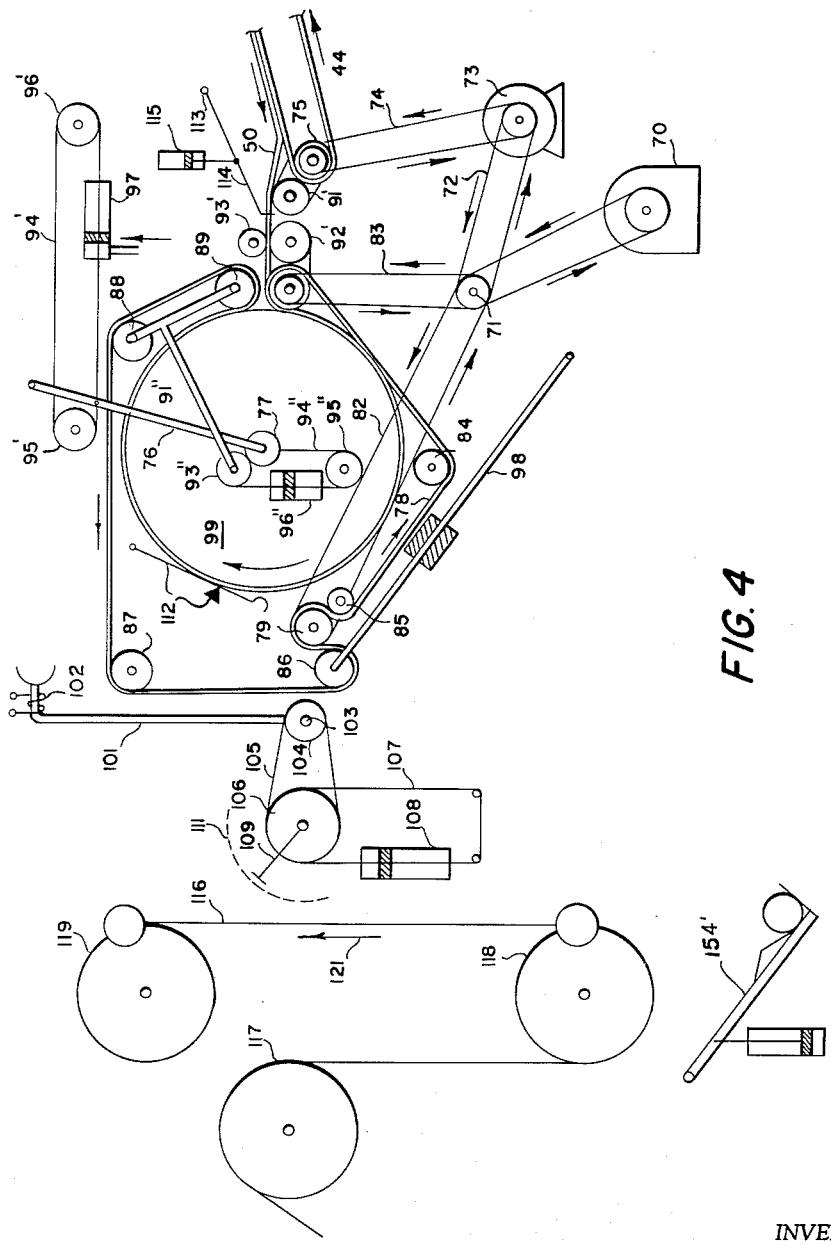
Figure 5:
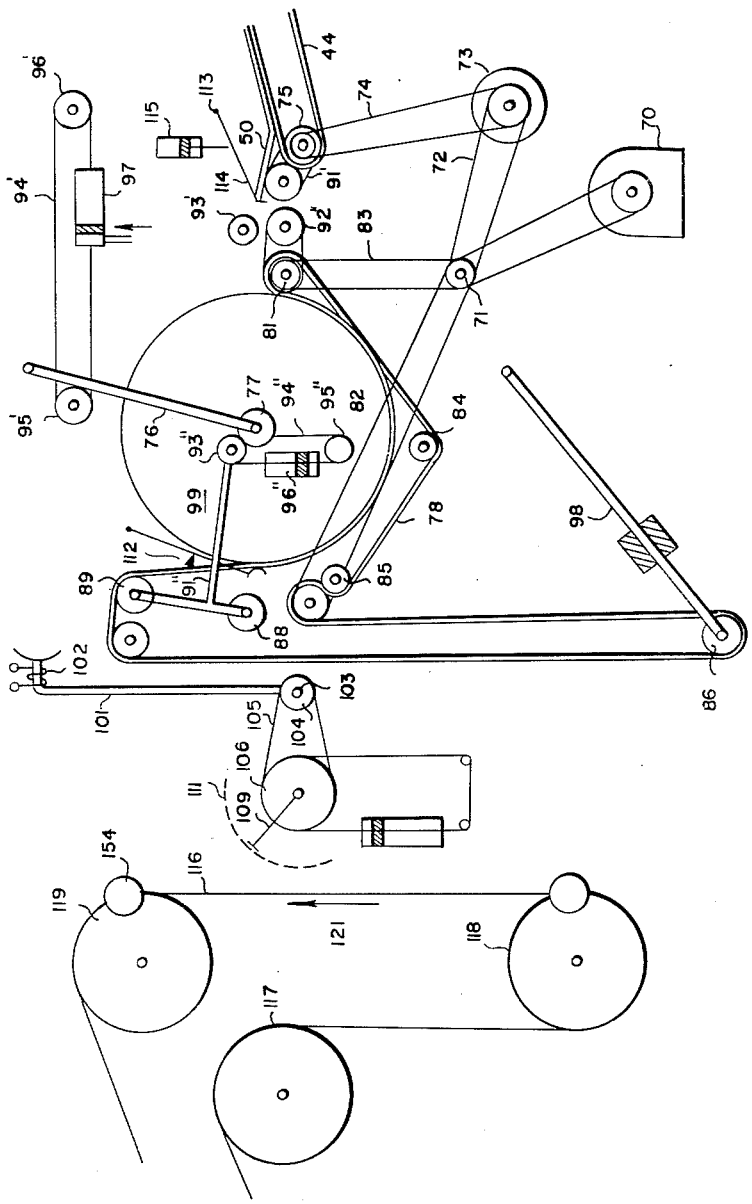
Figure 6:
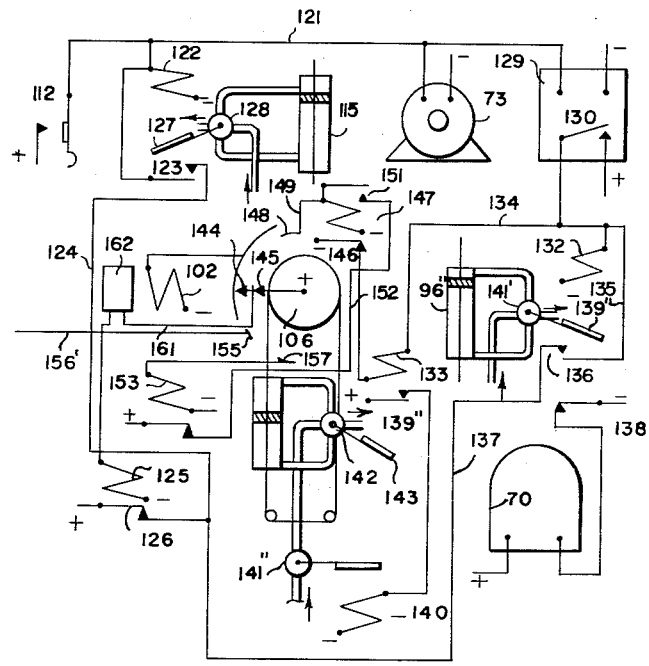

The invention will be further described below in connection with the attached drawings, in which FIG. 1 shows in schematic form an exemplary arrangement for feeding mineral wool to a saw device for cutting the mineral wool; FIG. 2 shows the said saw device in a more complete form; FIGS. 3, 4 and 5 show the apparatus according to the invention in three different stages of operation; and FIG. 6 shows a wiring diagram for the electrical as well as the pneumatic conduits in the apparatus for controlling the operation of the machine.

In connection with the following, it should be kept in mind that mineral wool, especially rock wool, is thrown out at its production, the so-called spinning, and is collected on a conveyor belt, so that it forms a mineral wool mat. The mineral wool has at some suitable time, for instance during the discharge from the spinning machine, been sprayed with a curing plastic, preferably in solution, said plastic having for its purpose later on to bind the mineral wool fibres into a rigid network. The mineral wool thus produced is wound on bale cores into bales, where it loses to a considerable extent its character of a mat, dependent upon the proper power of the fibres to hook into each other, and also dependent upon the curing plastic solution.

In FIG. 1 a conveyer 10 is shown, which works in steps, so that one bale of mineral wool can be fed into the lower end, where the bale 11 is situated in the drawing, as soon as an empty place is created by the conveyor chain carrying forward the bales 11, 12, 13, 14 and 15 one step, until the bale 15 will assume the position which is assumed in the drawing by the bale 16. The bale 16, as a matter of fact, has just been caught by an arm 17, which is manipulated by a servo motor 18, so that it has moved from the normal position indicated by 17' into the position 17 for carrying up a new bale as soon as one bale has been fully consumed for the production of the mineral wool mat, from which the pipe shells are produced. The last mentioned bale in FIG. 1 is indicated by dotted lines at 19. The production of the mineral wool mat, from which the pipe shells are wound, takes place by means of a band saw with an endless saw blade, rotating around a wheel 20, FIG. 1, as well as around a second wheel, which is in FIG. 1 situated behind the wheel 20, so that it is not visible. The blade will then attack the mineral wool bale at 21.

The arrangement of the saw will be more easily visible from FIG. 2. The conveyor chain in the conveyer 10 is there indicated at 23. It runs around a turn-over-roller 24 and is provided with catchers distributed over even distances, one catcher 25 being visible in FIG. 2. These catchers attack the bale cores 26 and carry the bale cores along each time when the conveyer 23 moves one step (one catcher distance) forwardly.

In FIG. 2 the arm 17 has just brought the bale 16 into sawing position, and as a consequence thereof the bale 15 has moved up into the position in which the bale 16 was situated according to FIG. 1. An empty place thereby is created in the position where the bale 11 in FIG. 1 was located, and this empty place is filled by a new bale being fed in, for instance, by hand. The movement of the arm 17 is caused by means of a servo motor 18, which may be pneumatic. It is controlled by a valve 27, which is connected to the two sides of the piston of the servo motor by means of conduits 28 and 29, with a source of a pressure medium by means of a conduit 30, and with the free atmosphere by means of a conduit 31. The valve is arranged in such a way, that it will connect in its one end position the pressure conduit 30 with the conduit 28 and the conduit 29 with the air-release conduit 31, and in its other end position will connect the pressure conduit 30 with the conduit 29 and the conduit 28 with the air-release conduit 31. The valve is controlled by a magnet 32 with core 33.

The saw wheel 20 carries a saw blade 36, the attack of which on the bale 16 is controlled by the bale 16 resting on a roller 37, which is mounted one end of a controllable arm 38, said arm being turnable about a pin 39 and lockable by means of a scale 40. When the arm 38 is turned in clock-wise direction, the roller 37 is lowered, and by its weight the bale 16 will then follow, so that the saw blade attacks deeper in the bale. The saw blade is rotated by the motor 42.

For feeding the bale 16 in the direction of the arrow 43 there is provided a conveyor belt 44 of rubber or similar material, which is driven in a way, which will be further described in connection with FIGS. 3, 4 and 5. The conveyor belt runs over the rollers 45, 46, 37 and 47. Due to the pressure between the bale 16 and the conveyor belt 44 at the place of contact between the roller 37 and the bale 16, the bale 16 is brought, together with the bale core 48, to rotate in a bearing 49 provided at the free end of the arm 17. As a consequence hereof a mat 50 of desired and constant thickness is cut out from the bale and conveyed to the conveyor belt 44.

During the sawing of the mat 50 from the bale 16, its diameter is decreased, and the arm 17 is lowered by the weight of the bale 16 together with its core 48 downwardly simultaneously in counter clock-wise direction. A contact arm 52 rests on the bale, said contact arm, when the bale is empty, contacting a counter contact 53, so that a circuit is closed for the magnet 32 over a path 54. The magnet 32 then attracts its core 33 and reverses the valve 27, so that pressure air is fed to the side of the cylinder of the servo motor 18, which is in FIG. 2 the upper side, over the conduit 29, whereas the lower side of the cylinder of the servo motor is connected with the outer atmosphere over the conduits 28 and 31. The piston is thereby displaced downwardly and moves the arm 17 in clock-wise direction by means of drag bar 55, 56 and an arm 57. The core 48 is then displaced into a fork-formed guide arm 58, which encloses it on both sides of the bales, so that it will fall out from the encroachment in the half bearing 49 and fall down onto a store of bale cores, which is not shown in the drawing. The guide arm 58 is turnably geared around a bolt 59. In its other end position consequently the arm 17 will catch up the member 15. In this end position the arm 17 attacks the member 61, which is arranged in such a way that it will open the switch 62 connected into the circuit 54. As a consequence thereof the magnet 32 will demagnetize, and the valve is again turned over into the position shown in FIG. 2, whereby the servo motor 18 will transfer the arm 17 into the position shown in the drawing, thereby carrying the new bale with it and lifting the arm 58. The sawing of a new bale will immediately start after this has moved into the sawing position shown in FIG. 2. It is true that meantime the belt in the conveyer 44 has been displaced some distance, but the interruption in the mineral wool mat will, as will be evident from the following, have no adverse effect.

When the arm 17 influenced the bolt 61, a contact 63 was also closed, which closes a circuit containing the conductors 64 and 65. These are shown in their continuation in FIG. 1. They have for their purpose the starting of the driving motor 66 for the belt conveyor 10. The driving circuit of the driving motor 66, as a matter of fact, normally runs from the plus terminal over a contact 67, the circuit 68 and the motor 66 to the minus terminal. The contact 67 is resiliently influenced and is normally in its closed position, so that the driving motor is kept running, but it is arranged to be influenced to be switched over into open position any time when a recess in the conveyor chain 23 over the conveyer 10 passes said contact. Said recesses are arranged with such inter-spaces, and with such a displacement, that the circuit is opened and the motor 66 brought to a stop as soon as the uppermost bale on the conveyer 10 is brought up in the position which is, in FIG. 1, assumed by the bale 16. The contact 67, however, is connected in parallel to the contact 63 with the consequence, that, as soon as the contact 61 is opened and the arm 17, carrying the uppermost bale from the conveyer 10 starts its counter clock-wise movement, the motor 66 will for a short moment get current, and the open contact 67 will be closed. The motor continues thereafter its movement, fed with current over the now closed contact 67, simultaneously as the contact 63 is practically immediately opened, until the next but uppermost bale has moved into the uppermost position, when the contact 67 is again opened and the motor brought to stop.

FIGS. 3, 4 and 5 show, how the conveyor belt 44 is driven, and how the mineral wool mat 50 is rolled onto the mandrel. The driving is obtained from a slowly running motor, for instance a cog gear motor 70, which over its belt disk, drives a belt disk shaft 71 with a plurality of belt disks for driving different means. One belt disk, mounted on the belt disk shaft 71, thus drives the belt 72, which is connected to the in-put shaft of a magnet coupling 73. The out-put shaft from this magnet coupling drives, over the belt 74, a belt disk which is mounted on the roller 75, over which the conveyor belt 44 runs in the direction of the arrows shown at the side of the conveyor belt. Consequently the conveyor belt 44 will only be moving as long as the magnet coupling 73 is attracted.

When the conveyor belt 44 is moving, it will feed a mat 50 of mineral wool to the winding apparatus. This substantially consists in the following parts, viz. a holder for a mandrel 77, mounted on an oscillatable arm 76, the sawed mineral wool 50 being wound up over said mandrel into a pipe shell, and also a winding mechanism, consisting in an endless belt 78, for instance of rubber, which runs over a number of directional rollers. Two of the directional rollers for the rubber belt 78, viz. the rollers 79 and 81, are driven by means of belts 82 and 83 from belt disks, which are mounted on the common belt disk shaft 71. In addition to the two driving rollers 79 and 81 there are three fixed rollers 84, 85 and 87, and one weight-loaded roller 86, and finally two movable rollers 88 and 89. The rollers 88 and 89, as a matter of fact, are arranged at each end of the upper piece of a T-formed arm 91″, which is turnable about the shaft 92″. On the same shaft 92″ a wire disk 93″ is mounted with a wire 94″, which is endless and runs over one further wire disk 95″, and which also carries a piston of a pneumatic servo motor 96″. Later on will be described how this is brought into operation.

For the description of the function of the arrangement now described it is assumed that the motor 70 is running, further that the magnet coupling 73 is operated, and finally that a mandrel 77 is situated in the place shown in FIG. 3. Due to the movement of the conveyor belt 44, sawing of a mineral wool mat 50 will take place, and this will be carried by the conveyor belt 44 into a feeder device, consisting in the rollers 91′, 92′, and 93′, from which the roller 91′ is driven from the roller 75 and the roller 92′ is driven from the roller 81. The roller 93′ is an idle roller and rests with its gravity on the mat 50 and thereby on the roller 92′. The mat 50 thereafter runs on over the driving roller 81 and the rubber belt 78 running thereon. Thereafter the mineral wool mat will be pressed into the slot between the mandrel 77 and the rubber mat 78 and in this way it will be rolled up around the mandrel. Thereby a given pressure is executed on the roller of the mineral wool mat by the arm 76 being put under pneumatic pressure.

The arrangement for the last mentioned purpose consists in a wire 94', which runs over two rollers 95' and 96', and further is attached to the arm 76, and finally is attached to the piston in a pneumatic pressure cylinder 97 with such a direction of pressure that the arm 76 tends to turn in counter clock-wise direction.

The arm 98, on which the roller 86 is geared, serves as a spanner device for the endless rubber belt 78. For this purpose a movable counter weight is provided on the arm 98, by the displacement of which on the arm 98 a suitable tension is obtained in the endless rubber belt 78.

During the function of the now described arrangement, the mineral wool pipe shell 99 wound onto the mandrel 77 will successively grow, and it will finally reach a size at which continuous winding of the mineral wool should be interrupted, and the pipe shell thus formed together with the mandrel placed in it should be removed, and a new mandrel should be brought into working position according to FIG. 3. This state or phase is shown in FIG. 4.

For removal of the ready-wound pipe shell 99 there is provided an arm 101 with a magnetically controlled catcher device 102. The arm 101 is turnably geared about a shaft 103, on which a wire disk 104 is mounted, said wire disk by means of the rigidly connected wire 105 being driven from a wire disk 106. This is also provided with a second rigidly connected, endless wire 107, which is connected to the piston in a pneumatic servo motor 108. Further, on the wire disk 106 a contact arm 109 is secured, said contact arm moving over a series of contact segments 111 for a purpose which will be evident from the following specification. Further a detecting arrangement in the form of an electrical contact 112 is arranged to be closed, when the pipe shell 99 has grown to a given magnitude. In the drawing this contact 112 has been shown schematically so that it is influenced by the outer circumference of the pipe shell. However, it may be arranged to be influenced from any part connected with the pipe shell, for instance the shaft end of the mandrel.

The purpose is that when the detecting arrangement 112 indicates, that the growing of the pipe shell 99 should be stopped, a series of functions should be started. Firstly the feeding of further mineral wool mat 50 should be prevented, which takes place by a teeth-provided arm 114, which is turnable about a center 113, being displaced downwardly by a pneumatic servo motor 115, so that the teeth on the arm will enter into the mineral wool mat 50 thereby causing the mineral wool mat 50 to be torn in a distinct place perpendicularly to the direction of movement of the mat. Secondly the magnet coupling 73 should be de-magnetized, so that it is released by its spring-force, and the conveyor belt 44 should stop. Thereby also the sawing will stop, although the motor 42 and the saw blade 36 will still be moving. Thirdly, the catcher arm 101 should, by influence from the pneumatic servo motor 108, be turned in clock-wise direction, until its catcher device 102 closes around the shaft of the mandrel 77, and thereby current should be passed through the magnet winding of the catcher device so that when the arm 101 returns, a ready-wound pipe shell 99 together with the mandrel 77 will be moved away from the winding device. In order for this to occur, however, the two spanner rollers 88 and 89 must have been moved from their positions shown in FIG. 3, which takes place under influence of the pneumatic servo motor 96", the endless rubber belt 78 simultaneously being kept spanned by influence from the spanner roller 86 provided on the arm 98. Thereafter the direction of pressure in the servo motor 108 is reversed, so that this will carry away the ready-wound pipe shell 99 together with its mandrel 77, and give off this to a double conveyor chain 116 provided with catchers, which chain as shown in the drawing runs over three wheels 117, 118 and 119, shown in FIG. 3 in the direction of the arrow 121. This takes place by the catchers being so placed, that they are hit by the mandrel 77 when this mandrel, resting in the magnetic catcher device, is carried in counter clock-wise direction by the arm 101. When the mandrel impinges the catchers, it is retained by these, and it is therefore carried free of the magnetic catcher means 102, whereby the arm 101 continues in counter clock-wise movement so far, that it can be passed by a new empty mandrel which is fed forward when the conveyor chain 116 has moved one catcher distance in the direction of the arrow 121 to the position where the mandrel 77 was just made free from the arm 101. A device schematically indicated in FIGS. 3 and 4 at 154' feeds the new empty mandrel.

The arm 101 now changes its direction of turning and moves in clockwise direction and catches the new empty mandrel, which has been moved to the place where the mandrel with mineral wool mat wound thereon was located. Here the magnetic catcher device 102 on the arm 101 will take up the new empty mandrel and carry this in clock-wise direction with it. As soon as the new empty mandrel has been brought by the arm 101 into the position in which the mandrel 77 is located in FIGS. 4 and 5, the needle bearings in the end of the arm 76 will attack the mandrel and retain this, whereby current to the magnetic catcher arrangement 102 is cut off, and the arm 101 is returning into the position of rest, which is shown in FIGS. 3, 4 and 5, said arm thereafter stopping its movement. Thereafter the arm 114 shall be moved up from the mineral wool mat, and the magnet coupling 73 shall again be closed, so that the conveyor belt 44 is put in movement.

Therefore, it is a series of rather complicated movements which are to be executed in a carefully adapted consequence of time. For explaining how they are created therefore different positions of the already described arrangement in FIG. 3 have been shown in FIGS. 4 and 5, and a specific electrical and pneumatic wiring diagram has been shown in FIG. 6. However, it should be mentioned that the impulse for starting all of this procedure is given from the contact 112. This will in that way determine all of the intermittent working cycle of the winding apparatus. In short terms one could therefore say that the contact 112 will give the impulse for the time determined working procedure of all of the winding apparatus with the exception for the feeding of a new bale, after the one shown in the arrangement according to FIG. 1 has been consumed.

It should also be mentioned in this connection that during the time between the consumption of one bale and the feeding of a new bale, an interruption may occur in the mineral wool mat 50. During all of this time, however, the winding apparatus according to FIGS. 3, 4 and 5 will continue to run, but no further mineral wool is of course added to the pipe shell. However, this has no decisive importance, because the impulse for the exchange operation in the winding apparatus is not determined by a timer but exclusively dependent upon the growing of the pipe shell produced from the mineral wool. Thereby it is ensured that the complete machine will work in the most effective possible way, maintaining a sufficiently exact outer diameter of the mineral wool pipe shells given off from the winding apparatus. As already mentioned, the mineral wool is sticky in this state, and it therefore tends to felt itself together, so that the joint between two pieces of the mineral wool mat will scarcely be observable.

In FIG. 4 all of the parts which are shown in FIG. 3 have been shown. However, it is assumed that in the positions which said parts occupy in FIG. 4, the pipe shell 99 has been wound to such a thickness that by contact with the spring in the switch 112 this switch has just been closed. During the growing of the pipe shell 99 the arm 76 has been displaced in clock-wise direction against the action of the pneumatic pressure in the device 97. The closing of the contact 112 now causes, in a way which will be further described in connection with the electrical-pneumatic wiring diagram in FIG. 6, the servo motor 115 to be activated simultaneously as the magnet coupling 73 is released. Due to the function of the servo motor 115 the arm 114 is lowered down onto the mineral wool mat 50, which is thereby torn off during the continuous movement of the rubber belt 78. Due to the magnet coupling being released, the belt 74 and the conveyor path 44 will stop, and even though the saw blade 36, see FIG. 2, will continue working, no more material is fed to said saw blade. The formation of further mineral wool mat at the sawing device as well as the conveying of such further mineral wool mat is thus stopped.

In this state, however, the rubber belt 78 will continue its work some further time, corresponding to one or some few turns of the mandrel 77. The purpose of this is, that one should get the outer surface of the formed mineral wool pipe shell 99 smoothed out, especially at the place where the fed mineral wool mat ends.

Until this moment the arrangement therefore remains in the state, shown in FIG. 4. The arm 101 thus is still in its position of rest, and the chain 116 is in stand-still.

As mentioned above, the pneumatic-electrical wiring diagram is shown in FIG. 6. Of the parts already mentioned, there are shown the switch 112, the coil 102 of the magnet which retains the mandrel of a fully wound mineral wool pipe shell in the catcher means of the arm 101, the motor 70, the magnet coupling 73 and the pneumatic servo motors 96'', 108 and 115. The character of this arrangement will be most simply illustrated by a description of its action when transferring the arrangement from the state shown in FIG. 4 into the state shown in FIG. 5.

When the switch 112 is closed, the plus terminal of the mains is connected over said switch to a conductor 121. The winding of a relay 122 is connected to this conductor. The other terminal is connected to the minus terminal of the mains, so that the relay 122 will immediately be magnetized. The relay thereby closes its contact 123, and thereby the plus-voltage at the one terminal of the relay will be retained even if the switch 112 should be opened. This takes place over a conductor 124, which is connected to the contact 126 on a binding releasing relay 125. The relay 122, however, simultaneously turns over by means of its armature 127 a valve 128, which controls the function of the servo motor 115, so that pressure medium is fed to the upper chamber in FIG. 6 of the servo motor, and its piston is displaced downwardly. This causes, as one can also see in FIG. 5, that the arm 114 is brought to attack the mineral wool mat and tear it off, and to stop further feed to the winding apparatus in this way.

By means of the conductor 121, however, current is also fed to the winding of the magnet coupling 73. This coupling is of the kind, in which the coupling is kept in a power-transfer position by means of a spring, but at magnetization of the magnet in the coupling it is brought to release this transfer of power. The magnet coupling is therefore now released, and it will remain released as long as positive voltage is fed over the conductor 124 from the contact 126 on the self-binding release relay 125. Consequently also the movement of the conveyor belt 44, see FIG. 5, will stop. Thereby also the function of the saw device stops in the above mentioned way, although the saw blade will still be in movement.

Finally positive voltage is also fed over the conductor 121 to a time-delay device 129. This functions in a way known per se, for instance as a so called stairway automatic, in that it will for a short time close a contact 130, but not until a given time has lapsed from the moment when positive voltage was fed to the time-delay device 129. This period of time is adapted in such a way that it mainly corresponds to two turns of the mineral wool pipe shell 99, now ready wound, as already mentioned.

When the contact 130 was closed, a second series of functions was started. In the first place two relays 132 and 133 are magnetized by positive voltage fed over the conductor 134. The relay 132 closes a holding circuit common for both of these relays over the conductor 135, the contact 136, the conductor 137 and the contact 126 on the binding release relay 125. The relays 132 and 133 therefore remain attracted, even if the contact 130 should be opened, until the binding release relay 125 is magnetized.

The magnetization of the relay 132 causes the circuit to the driving motor 70 for the belt 78 to be opened at the contact 138, and the motor will be free of current, so that the movement of this motor and thereby also of the belt 78 stops. Further the magnet in the relay 132 attracts its armature 139', whereby a valve 141' is turned over, and pressure medium is fed to the upper chamber in the pneumatic servo motor 96''. The piston of the servo motor is due thereto displaced downwardly, and by means of the rollers 93'' and 95'' and the wire 94'', see FIG. 5, the arm 91'' is turned into the position shown in FIG. 5, whereby the length of the belt 78 made free is consumed by the spanner roller 86 applied on the arm 98. Thereby access is opened to the space in which the ready-wound mineral wool pipe shell is placed so that this can be collected.

The collection of the ready-wound mineral wool pipe shell 99 takes place by the action of the relay 133. This relay obtained current for its magnetization simultaneously with the relay 132, and it also obtained holding current over the conductor 135, the contact 136, the conductor 137 and the contact 126. At its magnetization this relay connects at the contact 139'' magnetization current to an auxiliary magnet 140, which causes by means of its armature the opening of a valve 141'', which feeds a pressure medium to the control valve 142 for the servo motor 108. This control valve 142 is simultaneously directly turned over by means of the magnet over the relay 133 in such a direction, that pressure medium is fed to the lower chamber in the servo motor 108, the turning over of the valve 142 being caused by the armature 143. Consequently the arm 101 will turn from its position of rest in clockwise direction, whereby it starts from its vertical position shown in FIG. 5. This movement is caused by the wheel 106, which carries a contact arm with two contacts 144 and 145. By means of the contact 144 positive voltage is closed to the magnet 102, so that it shall attract the mandrel 77 when the arm has been turned to its outermost position in clockwise direction, in which the claw on the catcher on the arm embraces the mandrel on the mineral wool pipe shell just wound.

The magnetization circuit of the relay 133 runs over a non-magnetized relay closed contact 146 on a relay 147 to a minus terminal of the mains. When the contact arm 76 comes into its outermost position, in which it has caught up the mandrel of the ready-wound mineral wool pipe shell 99, obviously its direction of movement shall change in order of removing this shell from the winding apparatus. This takes place by the contact 145 contacting the contact segment 148, whereby positive voltage from the mains is closed over the arm on the roller 106, its contact 145, the contact segment 148 and the conductor 149 to the winding of the relay 147, which is immediately magnetized. Thereby the relay 147 closes a holding circuit over the contact 151, the conductor 152 and a contact on a limit position relay 153. Further the relay 147 opens its contact 146, whereby the relay 133 is de-magnetized, and the valve 142 is again turned over into the position shown in the drawing, in which position pressure medium is fed to the upper chamber in the pneumatic servo motor 108, and the arm 101 changes its direction of movement. Thereby the arm 101 carries with it the pipe shell 99 through the opening formed by the belt 78 having been brought apart by the two rollers 88 and 89.

During its continuous movement the arm 101 passes a position, in which its catcher device 102 aligns with a pair of catchers 154, see FIG. 5, on the double conveyor chain 116. These catchers function as receivers and retain the mandrel 77 and the pipe shell 99 mounted thereon against the action of the magnetization from the coil in the catcher device 102, so that the catcher device will be forced to leave the pipe shell and the mandrel, which are thereafter received by the hooks 154. The catcher device on arm 101 continues however its downward or counter clock-wise movement, whereby the contact 144 on the arm provided on the roller 106 within a short time will contact a contact segment 155, so that current is closed to the conductor 156′. In a way which forms no part of the present invention, this causes the conveyor chain 116 to start moving away the just received mineral wool pipe shell 99, simultaneously as an empty mandrel is brought up in such a position, such that it will be received by the arm 101 and removed into a position in order to form basis of a new mineral wool pipe shell, as already described in connection with FIG. 3.

The arm 101 continues its movement into its bottom position, in which the catcher means of the arm are situated below the empty mandrel in turn. At the contact 144 of this arm, current is there closed to a contact segment 157, whereby the relay 153 is magnetized and opens its non-magnetized relay-closed contact. The conductor 152 will thereby be free of current, and the holding of the relay 147 ceases, so that this relay is demagnetized. Its contact 146 is again closed, and the magnet 133 will obtain current, so that a re-setting of the valve 142 will take place. The arm 101 will therefore again move in clock-wise direction, carrying the empty mandrel with itself.

This movement will continue without interruption until the arm 101 has arrived at its opposite limit position, where the mandrel is given off in the position shown in FIG. 3, for the purpose that it shall serve at the winding of the next mineral wool pipe shell. In the same way as before now the relay 147 is magnetized and will get a holding circuit, so that the valve 142 is turned over, and the arm 101 will start its movement in counter clock-wise direction. When the arm 101 during this movement gets into its position of rest, as this is shown in FIGS. 3, 4 and 5, current is closed at the contact 145 to the holding release relay 125. It should however be observed that the arm 101 has passed its position of rest during movement partly when it carried in counter clock-wise movement the ready-wound mineral wool pipe shell to the receiver hooks 154 on the chain 116, partly when it carried in clock-wise direction the collected empty mandrel to its position, and that it is therefore now the third time that the contact 145 is closed. Only every third time current should really be given to the relay 125, and for this purpose the counting relay circuit 162 of a kind known per se is put into the conductor 161, said counting relay circuit giving voltage to the relay 125 for every third touch. At its magnetization the relays 125 opens at its contact 126 all of the holding circuit. Thus plus voltage is connected from the conductor 124, and the relay 122 is released. Thereby the arm 114 is lifted up by re-setting of the valve 128 and by means of the servo motor 115. Further the magnet of the magnet coupling is released, and by spring force the magnet coupling is connected, and the conveyor belt 44 starts again. Further the holding circuits are opened over the conductor 137 for the relays 132 and 133. At the release of the relay 132 caused thereby the valve 141′ is re-set, and the servo motor 96″ will transfer both of the rollers 88 and 89 from the positions which said rollers assume in FIG. 5 into their positions in FIGS. 3 and 4. When the relay 133 is released, the contact 139″ is opened, and the relay 140 is also released. The consequence will be, that the feed of pressure medium through the valve 141″ is stopped, so that no further movement of the servo motor 108 can take place. The arm 101 is therefore stopped in its position of rest, and the complete arrangement has re-assumed the position shown in FIG. 3.

The winding apparatus is new prepared for providing a new mineral wool pipe shell in the same way as described above, and this production of the next mineral wool pipe shell will start immediately.

It will be evident from the above that an intermittent function has been provided of the arrangement, and that the time of the intermittent function is exclusively determined by a mineral pipe shell being wound until a given thickness, determined by the switch 112 being closed. When this switch is closed, all of the series of function will take place automatically in a given order of time, said functions being required for giving off the ready-made mineral wool shell, receiving a new mandrel, transferring this to its starting position and starting the winding of a new mineral wool shell.

The invention, of course, is not limited to the specific form of execution thereof, which has been described above, and which has been shown in the attached drawings, but different modifications may occur within the frame of the invention.

What we claim is:

1. A device for the production of sleeves from mineral wool by winding a plurality of turns of a mat of mineral wool onto a mandrel, comprising: a rotatable mandrel; an endless belt for driving said mandrel, said endless belt being mounted to engage the mandrel over a majority of the periphery thereof; means for feeding a mat of mineral wool between the surface of said mandrel and said endless belt; a plurality of pressure rollers mounted for applying pressure on the endless belt and against the surface of said mandrel, one of said pressure rollers applying pressure to said belt and said mandrel at a point immediately before the point where said mat of mineral wool moves onto the surface of said mandrel, and another of said pressure rollers being mounted so as to apply its pressure at a place immediately after the point where said mat moves onto the surface of said mandrel, the first of said pressure rollers being resiliently mounted and the other of said pressure rollers having a fixed position; means mounting said mandrel for yielding movement in response to pressure from said pressure rollers as the sleeve of material on said mandrel increases in diameter; means for cutting off the mat of mineral wool and for stopping the movement of said endless belt; and detector means for activating said last mentioned means in response to a predetermined movement of said mandrel in a direction away from said pressure rollers, said detector means comprising means for stopping the movement of the endless belt only after a given time after the cutting of said mat of mineral wool.

2. Mat winding apparatus comprising: a rotatable mandrel for receiving a plurality of layers of mat material; an endless belt for driving said mandrel; means mounting said endless belt for selective engagement with said mandrel over a majority of the periphery thereof; means for feeding a mat of material to be wound to the line of engagement of said endless belt with said mandrel so as to cause said mat to be wound around the periphery of said mandrel; first and second pressure rollers for applying pressure on said endless belt against the periphery of said mandrel; means mounting said first roller for movement into and out of contact with said mandrel through said endless belt, said second roller having a fixed position; means mounting said mandrel for movement in response to increasing thicknesses of mat material accumulating thereon and bearing against said pressure rollers; means for stopping the feed of said mat of material into engagement with the periphery of said mandrel by severing the mat at a point prior to the point where said mat presses into engagement with the periphery of said mandrel; and means for actuating said last mentioned means and for stopping the rotary movement of said endless belt in response to a predetermined thickness of mat material being wound on said mandrel.

3. Apparatus as set forth in claim 2 further comprising means for delaying the stoppage of said endless belt until a predetermined time after the feed of said mat to said mandrel has been stopped.

4. Mat winding apparatus comprising: a rotatable mandrel for receiving a plurality of layers of mat material; an endless belt for driving said mandrel; means mounting said endless belt for selective engagement with said mandrel over a majority of the periphery thereof; means for feeding a mat of material to be wound to the line of engagement of said endless belt with said mandrel so as to cause said mat to be wound around the periphery of said mandrel; first and second pressure rollers for applying pressure on said endless belt against the periphery of said mandrel; means mounting at least one of said rollers for movement into and out of contact with said endless belt; means mounting said mandrel for movement in response to increasing thicknesses of mat material accumulating thereon and bearing against said pressure rollers; means for severing said mat of material at a point prior to the point where said mat passes into engagement with the periphery of said mandrel and for stopping the movement of said endless belt in response to a predetermined thickness of mat material being wound on said mandrel; and means for delaying the stopping of said endless belt until a predetermined time after the severance of said mat of material.

5. Mat winding apparatus comprising: a rotatable mandrel for receiving a plurality of layers of mat material; an endless belt for driving said mandrel; means mounting said endless belt for selective engagement with said mandrel over a majority of the periphery thereof; means for feeding a mat of material to be wound to the line of engagement of said endless belt with said mandrel so as to cause said mat to be wound around the periphery of said mandrel; first and second pressure rollers for applying pressure on said endless belt against the periphery of said mandrel; means mounting said first roller for movement into and out of contact with said mandrel through said endless belt, said second roller having a fixed position; means mounting said mandrel for movment in response to increasing thicknesses of mat material accumulating thereon and bearing against said pressure rollers; means for stopping the feed of said mat of material into engagement with the periphery of said mandrel by severing the mat at a point prior to the point where said mat presses into engagement with the periphery of said mandrel; means for actuating said last mentioned means and for stopping the rotary movement of said endless belt in response to a predetermined thickness of mat material being wound on said mandrel; said means for stopping the feed of said mat further comprising a conveyor feeding said mat, and means for stopping the feeding movement of said conveyor; and means for delaying the stoppage of said endless belt until a predetermined time after the feed of said mat to said mandrel has been stopped.

6. Apparatus as set forth in claim 5 further comprising a motor for driving said endless belt and said belt conveyor, and a releasable coupling between said motor and said belt conveyor whereby said belt conveyor can be stopped before the stopping of said endless belt.

References Cited by the Examiner

UNITED STATES PATENTS

| | | | |
|---|---|---|---|
| 2,742,240 | 4/56 | Stephens et al. | 242—78.5 X |
| 2,830,775 | 4/58 | Kiesel | 242—56 |
| 2,848,175 | 8/58 | Stephens et al. | 242—55.1 |
| 2,849,191 | 8/58 | Gadler | 242—56 |
| 2,880,943 | 4/59 | Stephens | 242—67.1 |
| 2,939,645 | 6/60 | Rowlands et al. | 242—78.2 X |
| 3,112,087 | 11/63 | Fornataro | 242—78.5 X |

FOREIGN PATENTS 680,464  10/52  Great Britain.

MERVIN STEIN, *Primary Examiner.*

RUSSELL C. MADER, *Examiner.*